May 10, 1938.    J. P. HOERNER    2,116,829
ATTACHMENT FOR LAWN MOWER
Filed Oct. 7, 1935    2 Sheets-Sheet 2
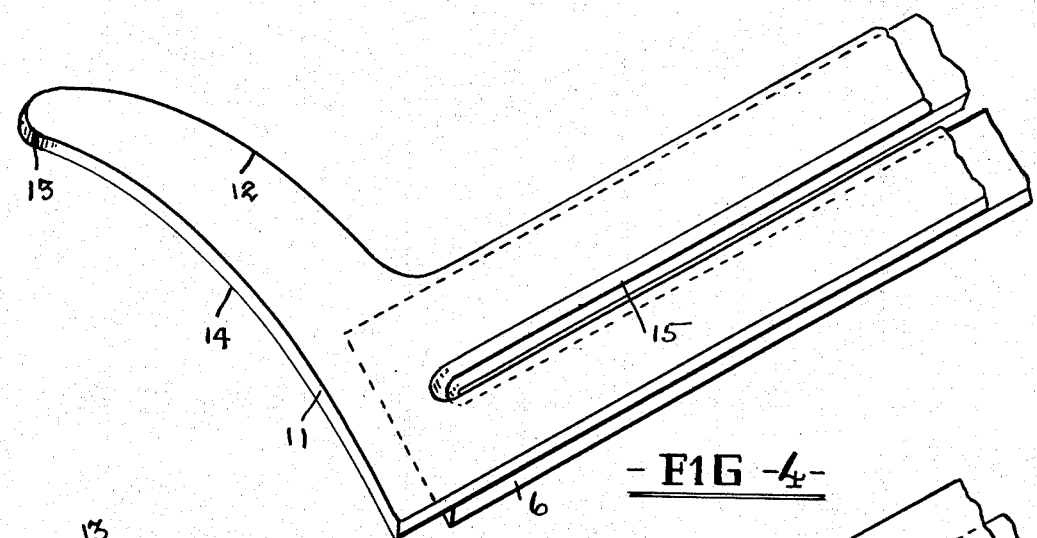
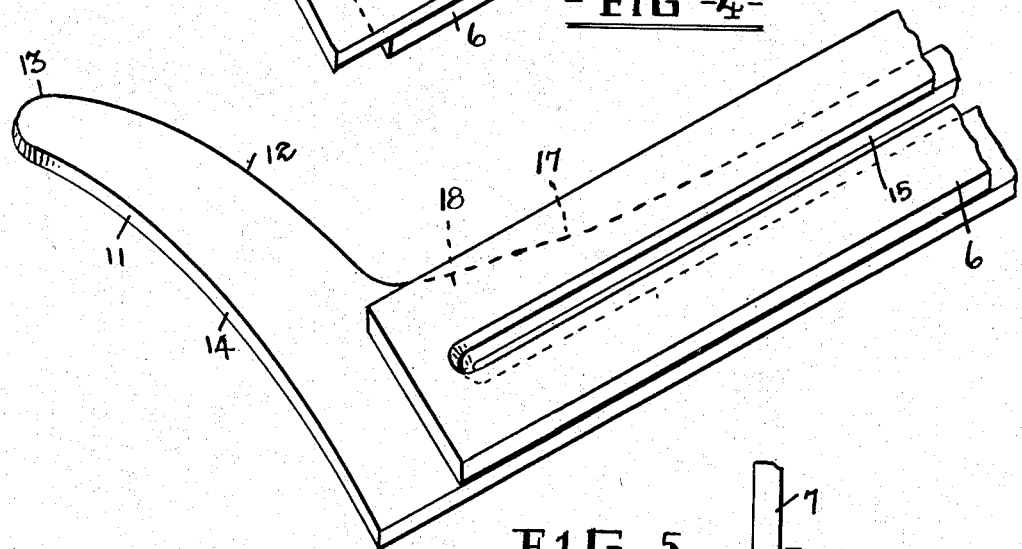
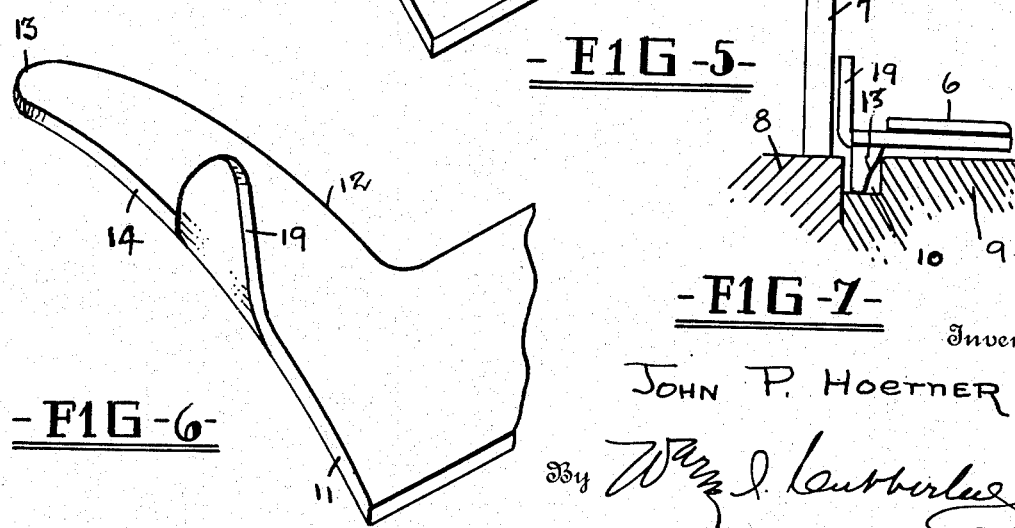
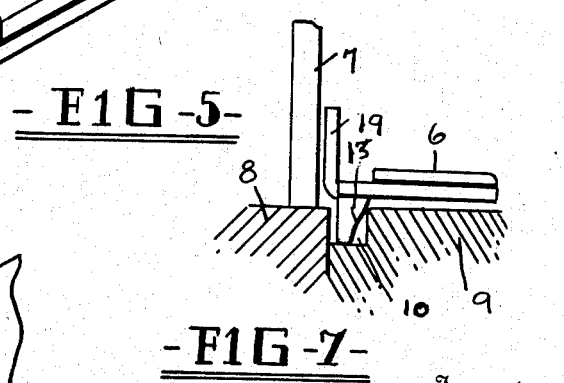
Inventor
JOHN P. HOERNER Patented May 10, 1938

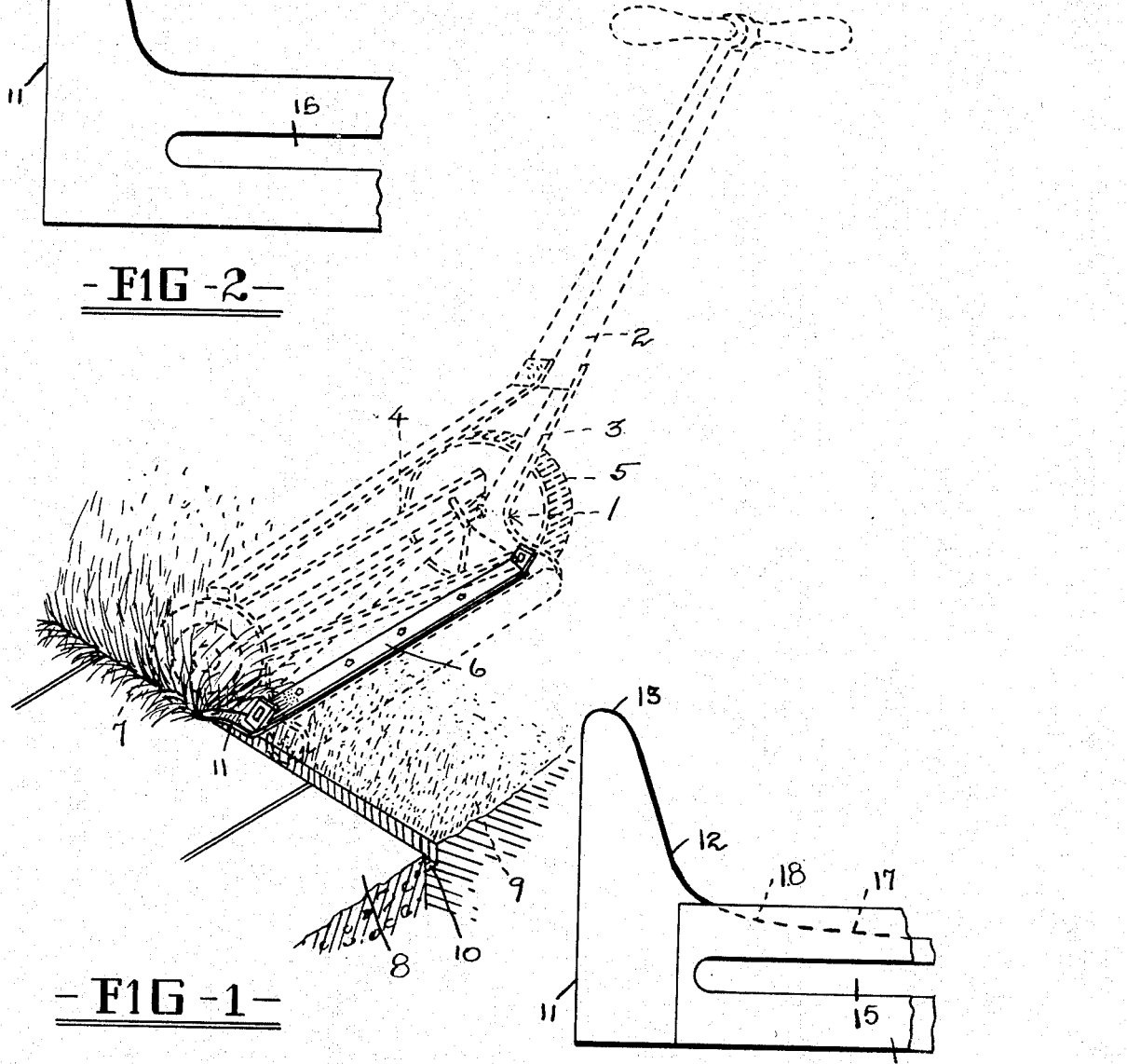

2,116,829

UNITED STATES PATENT OFFICE 2,116,829

ATTACHMENT FOR LAWN MOWERS

John P. Hoerner, Harrisburg, Pa.

Application October 7, 1935, Serial No. 43,971

4 Claims. (Cl. 56—249)

My present invention has to do with improvements in means and devices for simultaneously guiding and directing grass, weeds and the like into the cutters of a lawn mower or trimmer of the type having a frame having a handle attached thereto, and a ground or traction wheel at one end and a small guide wheel at the other and at the same time plowing a ditch along the edge of a sidewalk or the like where a grass plot meets the concrete, or the like, in order to produce a clean cut appearance to a lawn or the like.

At the present time there are on the market so-called "trimmers" which are very similar in construction and appearance to the usual rotary blade lawn mowers, except that they are adapted to facilitate cutting that portion of a lawn next to a hedge, walk, or other close quarters or rather inaccessible place. The particular type of trimmer to which my invention is designed to be applied has a handle and a frame attached to the handle, a ground wheel at one end and a small guide roller at the other end, a cutting reel or rotary cutter is supported in said frame which co-operates with a cutting blade which is supported on a cutter bar. My present invention contemplates the provision of a downwardly curved and pointed guide member which may be either a part of the cutter bar of the trimmer or mower, or formed as an accessory or attachment carried adjacent the cutter bar, for lifting and guiding blades of grass, weeds and the like (which would otherwise be missed by the trimmer or mower blades) into cutting proximity with the cutter blade, so that no uncut growths will remain after the mower or trimmer has passed over the lawn. Usually such inaccessible growths of grass and weeds accumulate along side walks and drives, along hedges and about fences, poles, bushes and the like, and heretofore it has been arduous work to trim these growths with hand tools such as sheers, hand trimmers, knives and the like. My attachment also functions as a ditcher to cut a small ditch along sidewalks and the like so that a pleasing and well groomed appearance is given a lawn or the like after my attachment has been used upon it. Another object of my invention is to provide means for preventing accumulation and clogging of grass, weeds and the like between my attachment and a part of the lawn mower or trimmer such as a wheel, and my attachment will not become dulled or inapt for use due to contact with stones, gravel, earth and the like such as is the case with disk cutters and trimmers. It may be used with either a right hand or a left hand trimmer, and it may be provided either flanged or unflanged and for use with any size trimmer, and in any case the construction and form is such that it may be manufactured and sold at small cost, either as an accessory in a hardware store or the like, or as a set-up part of a trimmer or mower. Furthermore, my attachment is capable of relatively wide variation as to size, shape, form and position with the result that it can be made to conform to different conditions of practical application.

In the drawings wherein I have illustrated a preferred form of my invention both in its application as an attachment or accessory, and as a part of the base or bed plate of a trimmer;—

Figure 1 is a perspective view of my device showing it in operation along the edge of a walk, and with the trimmer structure shown in dotted lines;

Figure 2 is a plan view of one end of my attachment;

Figure 3 is a view of my attachment when formed as an accessory for use with the conventional cutter bar of a mower or trimmer;

Figure 4 is a perspective view of an end of a cutter bar formed with my attachement;

Figure 5 is a perspective view of an end of my attachment when formed as an accessory for use with a conventional cutter bar;

Figure 6 is a perspective view of my attachment with a flange formed thereon to prevent clogging and the like, and Figure 7 is a vertical section showing the manner in which my attachment forms a ditch along the edges of a walk or the like.

In the drawings wherein like characters of reference are used to designate like or similar parts throughout the several views thereof;—

The numeral 1 designates a conventional trimmer which has a handle 2, a frame 3, rotary cutter reel 4, a traction wheel 5, a cutter bar 6 carrying the usual cutter blade and a guide wheel 7. Numeral 8 designates a walk, of concrete or the like, 9 a lawn, and 10 a ditch formed by my attachment between the edge of the walk and the lawn.

My attachment preferably is formed with a straight outside edge 11, a slightly curved inner guiding edge 12, a point 13, and is curved downwardly as at 14 a suitable distance to lift up and guide stray blades of grass, weeds and the like into cutting proximity with the rotary blades 4 and bed or base plate 6 and also to plow or cut a ditch 10 between a walk 8 and the lawn 9. It will be understood that the cutter-blade may be formed either with, or without, a machined cutting edge. When my attachment is formed as a part of the cutter blade and includes the cutting edge, the body of the bar as shown in Figures 2 and 4 is slightly extended as shown to form my attachment which is integral with it; there being the usual center receiving opening 15 which may be in the form of a slot open at the end or a closed slot (for reinforcement) or any other form of opening, for attaching the same to the carrier cutter bar. When my attachment is formed as an accessory, as shown in Figures 3 and 5, the edge beneath the cutter bar or base or bed plate is formed with a relatively long curved part 17 which provides a reinforcement at 18, and provides less width to the body of the accessory so that it will not interfere with the cutting edge of the base or bed plate. However, my accessory may be formed with the body part the same width as the cutter bar base or bed plate.

In order to prevent clogging of grass or weeds between my attachment and a part of the trimmer or mower, it may be formed with an upstanding flange 19 as shown in Figures 6 and 7, which serves to clear the space between my attachment and an adjacent part of the trimmer or mower. This flange is preferably located midway the ends of my attachment as shown, but it may be positioned at any desired point dictated by practice.

It will be noted that my attachment cannot be dulled by contact with stones, or the like, and that considerable variation may be indicated as to the extent of its downward curvature; also that much variation may be indicated as to forms of attachment, and the shape, size, and form of my invention to conform to varying requirements of practice.

I claim:

1. In lawn mowers and trimmers comprising a stationary cutter and rotary cutters operating in cooperation therewith; said stationary cutter formed with a pointed member at one of its ends extending downwardly below the tread of the wheels of the mower to plow a furrow as the mower is operated and forwardly and having a slightly curved inner edge for guiding grass, weeds and the like into cutting proximity with the stationary cutter and the rotary cutters.

2. In lawn mowers and trimmers comprising a stationary cutter and rotary cutters operating in cooperation therewith; said stationary cutter formed at one of its ends with a pointed member adjacent its cutting edge curved downwardly below the tread of the wheels of the mower to plow a furrow as the mower is operated and forwardly and having a curved inner edge and a relatively straight outside edge for guiding grass, weeds and the like into cutting proximity with the stationary cutter and rotary cutters and having a flanged portion on its outer edge for preventing clogging when the trimmer is in operation.

3. In lawn mowers and trimmers comprising a stationary cutter and rotary cutters; a member having a body portion extending parallel with and in proximity with the stationary cutter and having a curved edge to position the same out of the way of the cutting edge of the stationary cutter and gradually increasing in width to the ends to reinforce the member, and a downwardly and forwardly extending part on said member with an inner slightly curved edge and a pointed tip for passing under and lifting up grass, weeds and the like and guiding the same to the stationary cutter, the free end of said member extending below the tread of the wheels of the mower to plow a furrow as the mower is operated thereby functioning to form a ditch along the edge of a walk or the like.

4. An attachment for lawn mowers having a frame and a ground supporting means at each end thereof, a cutting reel supported in said frame and cooperating with a cutter blade secured to said frame, said attachment comprising an elongated member formed with a downwardly curved pointed portion at one end, said pointed portion having a curved inner edge and a relatively straight outer edge to guide grass, weeds and the like to the cutter blade, and the elongated portion being operatively attached to the cutter blade.

JOHN P. HOERNER.